T. A. BANTA.
CLIP OR FASTENER FOR GARMENTS, BINDERS, &c.
APPLICATION FILED FEB. 3, 1910.

987,687.

Patented Mar. 28, 1911.

Witnesses
Geo. F. Schwartz
S. Hubert

Inventor
Thomas A. Banta
By his Attorneys
Redding, Greeley & Austin

UNITED STATES PATENT OFFICE.

THOMAS A. BANTA, OF JERSEY CITY, NEW JERSEY.

CLIP OR FASTENER FOR GARMENTS, BINDERS, &c.

987,687.

Specification of Letters Patent.

Patented Mar. 28, 1911.

Application filed February 3, 1910. Serial No. 541,942.

*To all whom it may concern:*

Be it known that I, THOMAS A. BANTA, a citizen of the United States, residing in the city of Jersey City, in the State of New Jersey, have invented certain new and useful Improvements in Clips or Fasteners for Garments, Binders, &c., of which the following is a specification, reference being had to the accompanying drawing, forming a part hereof.

This invention has for its object to produce an improved clip or fastener, such as may be used for stocking or other garment supporters, for key-chain fasteners, for document binders and for many other purposes.

The improved clip or fastener is easily manipulated and is not liable to be accidentally disengaged.

The invention will be more fully explained hereinafter with reference to the accompanying drawing in which it is illustrated, and in which—

Figure 1:
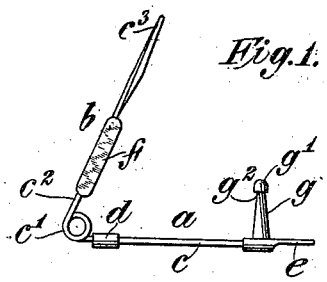
Figure 2:
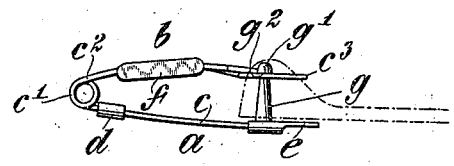
Figure 3:
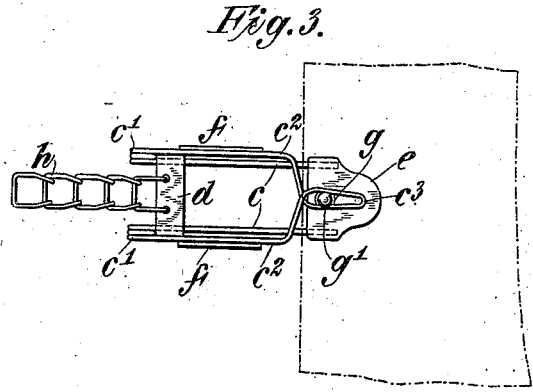
Figure 4:
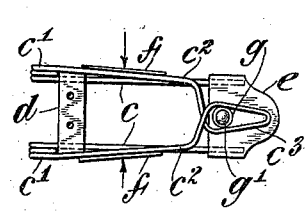
Figure 5:
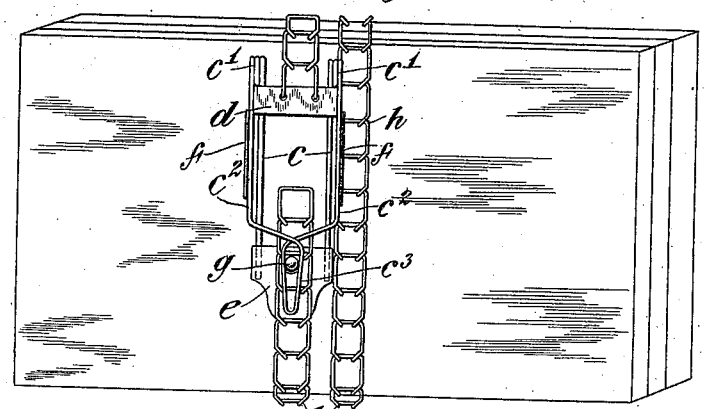

Figure 1 is a view in side elevation of the improved clip or fastener showing the same open. Fig. 2 is a similar view, but showing the device closed, the relation of the fabric to the clip or fastener being indicated by dotted lines. Fig. 3 is a plan view of the device closed, a light chain being shown as connected to the device, and a piece of fabric being indicated by dotted lines. Fig. 4 is also a plan view, but showing the loop opened to engage or release the stud. Fig. 5 is a view showing the application of the device to a document binder.

The device comprises a base part $a$ and a relatively movable member $b$ which is preferably connected to the base part $a$ by a spring hinge.

The device is most conveniently made of a continuous piece of spring wire, the base part $a$ being formed of two parallel members $c$, united at or near their ends by plates $d$ and $e$. The parallel wire members $c$ are extended and coiled, as at $c'$, to form spring hinges for the movable member $b$, which is itself formed by substantially parallel wire members $c^2$, which have at their extremity a twisted loop $c^3$ formed by a half twist of the wire members $c^2$ upon each other, so that, while the loop $c^3$ is normally closed or nearly closed by the spring action of the wire members $c^2$, as shown, for example, in Figs. 3 and 5, it may be opened as shown in Fig. 4, by inward pressure upon the wire members $c^2$ back of the crossing, which may be provided, if desired, with finger plates $f$. The base part $c$ bears a headed stud $g$, which may be supported conveniently on the plate $e$. The head $g'$ of the stud is preferably somewhat tapered at its extremity while its neck is defined by a somewhat abrupt shoulder $g^2$.

The device as described, and as shown in Figs. 1, 2 and 3, may be connected in any suitable manner to the strap of a stocking or other garment supporter. It may have connected to it, as by means of the plate $d$, a key-chain or other flexible band $h$, as shown in Figs. 3 and 5, and when so arranged may serve as a fastener for a document binder, as shown in Fig. 5.

It will be understood that when the device is used for a garment supporter, or for other similar purposes, the edge of the fabric is placed over the head of the stud $g$, as indicated in Figs. 2 and 3, and the relatively movable member $b$ is then pressed down upon the fabric, the loop $c^3$ opening to pass over the head $g'$ of the stud $g$ and then engaging the neck $g^2$ of the stud through the interposed fabric. If the device is used for a document binder or for other like purposes, as indicated in Fig. 5, a loop or eye of the chain or band $h$ is slipped upon the stud $g$ and the spring or movable member is then engaged with the stud as before. When it is desired to disengage the fastener pressure is applied to the wire members $c^2$ thereby causing the loop $c^3$ to open sufficiently, as indicated in Fig. 4, to be disengaged from the head of the stud $g$.

It will be understood that the device is not necessarily constructed, in the manner shown, of a single continuous piece of wire, such construction, however, being preferable as the most convenient in manufacture and the most satisfactory in use.

I claim as my invention:

1. A clip or fastener comprising a base part, a headed stud thereon, and a relatively movable member connected to the base part by a spring hinge and having a crossed spring wire loop adapted to engage said stud and to be opened by inward pressure on its members back of the crossing.

2. A clip or fastener consisting of a continuous wire having parallel members to form a base part, parallel members to form an upper part with a crossed loop, adapted to be opened by inward pressure on the members back of the crossing, a plate secured to the parallel lower members, and a headed stud mounted on said plate and adapted to be engaged by said loop.

3. A clip or fastener consisting of a continuous wire having parallel members to form a base part, spring coils at the ends of said members, parallel members continued from the spring coils to form the sides of a relatively movable upper member, and a crossed loop at the ends of said last named members, a plate secured to the lower parallel members, and a headed stud mounted on said plate and adapted to be engaged by said crossed loop.

This specification signed and witnessed this 21st day of January, A. D. 1910.

THOMAS A. BANTA.

Signed in the presence of—
W. B. GREELEY,
AMBROSE L. O'SHEA.

Copies of this patent may be obtained for five cents each, by addressing the "Commissioner of Patents, Washington, D. C."